US010530736B2

(12) United States Patent
Cox

(10) Patent No.: US 10,530,736 B2
(45) Date of Patent: Jan. 7, 2020

(54) METHOD AND APPARATUS FOR FORWARDING GENERIC ROUTING ENCAPSULATION PACKETS AT A NETWORK ADDRESS TRANSLATION GATEWAY

(71) Applicant: CISCO TECHNOLOGY, INC., San Jose, CA (US)

(72) Inventor: Brian Francis Cox, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 631 days.

(21) Appl. No.: 15/000,934

(22) Filed: Jan. 19, 2016

(65) Prior Publication Data

US 2017/0208032 A1    Jul. 20, 2017

(51) Int. Cl.
*H04L 29/12*    (2006.01)
(52) U.S. Cl.
CPC .................. *H04L 61/103* (2013.01)
(58) Field of Classification Search
CPC ............. H04L 12/4633; H04L 61/103; H04L 61/2514; H04L 61/2557; H04L 61/2567; H04L 61/2592; H04L 61/6022
See application file for complete search history.

(56) References Cited

U.S. PATENT DOCUMENTS 9,160,714 B2 * 10/2015 Westberg ............ H04L 63/0272
9,686,813 B2 * 6/2017 Bhatnagar ........... H04W 76/025
9,832,674 B2 * 11/2017 Ghai .................... H04W 12/04
2006/0259639 A1 * 11/2006 Aken .................. H04L 12/4633
                                                    709/245
2010/0118882 A1 * 5/2010 Gao ..................... H04L 12/4633
                                                    370/411
2014/0056290 A1 * 2/2014 Pazhyannur ............ H04W 4/00
                                                    370/338
2014/0181286 A1    6/2014 Jayasenan et al.
2014/0192808 A1    7/2014 Thubert et al.
2015/0009992 A1 * 1/2015 Zhang .................. H04L 49/354
                                                    370/392
2015/0012621 A1    1/2015 Patwardhan et al.
2015/0215810 A1    7/2015 Andreasen et al.
(Continued)

OTHER PUBLICATIONS

IETF RFC 1701, "Generic Routing Encapsulation (GRE)", S. Hanks et al., Oct. 1994.
(Continued)

*Primary Examiner* — Todd L Barker
(74) *Attorney, Agent, or Firm* — Cindy Kaplan

(57) ABSTRACT

In one embodiment, a method includes receiving on a private network at a Network Address Translation (NAT) gateway, a Generic Routing Encapsulation (GRE) packet comprising a client address and a GRE node private Internet Protocol (IP) address, mapping the client address to the GRE node private IP address at the NAT gateway, storing the mapping at the NAT gateway, replacing the GRE node private IP address in the GRE packet with a public IP address of the NAT gateway, and transmitting the GRE packet from the NAT gateway on a public network. Wherein the mapping is used in forwarding packets received on the public network at the NAT gateway to a client on the private network. An apparatus and logic are also disclosed herein.

16 Claims, 6 Drawing Sheets

(56) References Cited

U.S. PATENT DOCUMENTS

| | | | | |
|---|---|---|---|---|
| 2015/0319092 A1* | 11/2015 | Ghai | ........................ | H04L 47/12 |
| | | | | 370/230 |
| 2015/0319749 A1* | 11/2015 | Wadhwa | ............... | H04W 12/06 |
| | | | | 370/338 |
| 2016/0127149 A1* | 5/2016 | Xue | .................... | H04L 12/4633 |
| | | | | 370/392 |
| 2016/0173297 A1* | 6/2016 | Kanugovi | ........... | H04L 12/4633 |
| | | | | 370/328 |
| 2016/0182683 A1* | 6/2016 | Wear | ................... | H04L 61/2514 |
| | | | | 709/203 |
| 2017/0034820 A1* | 2/2017 | Liu | ........................ | H04W 28/02 |
| 2017/0086115 A1* | 3/2017 | Chung | ................ | H04L 41/0893 |
| 2017/0207921 A1* | 7/2017 | Rantapuska | .......... | H04L 9/3263 |

OTHER PUBLICATIONS

IETF RFC 2784, Generic Routing Encapsulation (GRE), D. Farinacci et al., Mar. 2000.

* cited by examiner

METHOD AND APPARATUS FOR FORWARDING GENERIC ROUTING ENCAPSULATION PACKETS AT A NETWORK ADDRESS TRANSLATION GATEWAY

TECHNICAL FIELD

The present disclosure relates generally to communications networks, and more particularly, to Generic Routing Encapsulation (GRE).

BACKGROUND

Generic Routing Encapsulation (GRE) is a tunneling protocol that may be used to encapsulate a wide variety of network layer protocols inside virtual point-to-point links over an Internet Protocol (IP) network. Ethernet over Generic Routing Encapsulation (EoGRE) is a popular protocol in the provision of community Wi-Fi services in Service Provider (SP) networks as it provides a lightweight and highly scalable Layer 2 (L2) connection between clients and wireless aggregation gateways. EoGRE may be used, for example, to aggregate Wi-Fi traffic from hotspots. This enables customer premise equipment (CPE) devices to bridge Ethernet traffic coming from an end host and encapsulate the traffic in Ethernet packets over an IP GRE tunnel. When the IP GRE tunnels are terminated on a service provider broadband network gateway, the end host's Layer 2 traffic is terminated and IP services managed for the end host.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
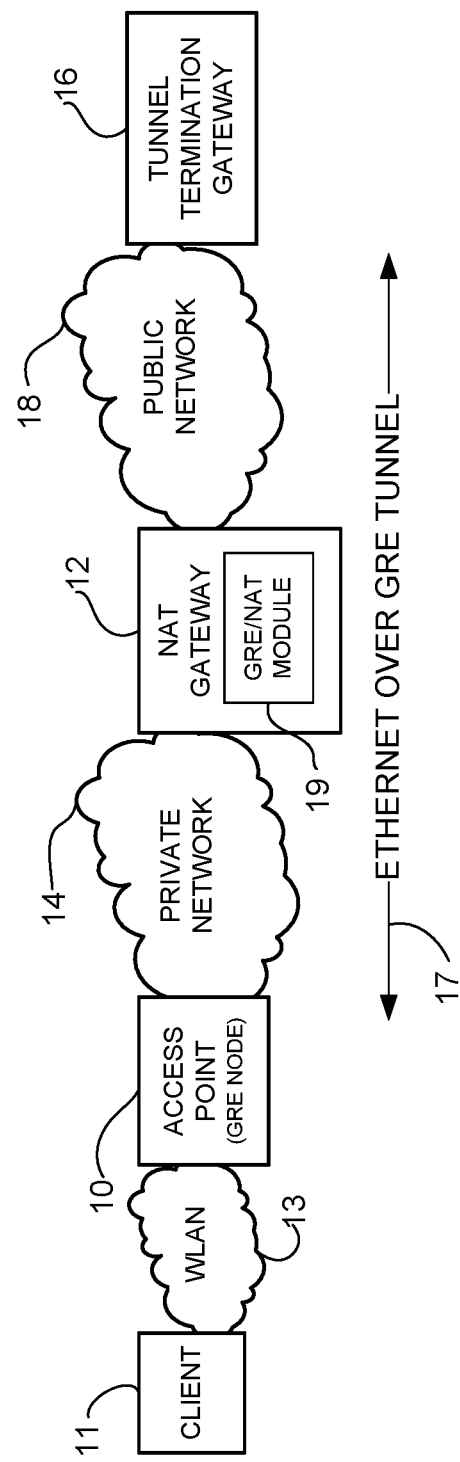
FIG. 1 illustrates an example of a network in which embodiments described herein may be implemented.

In one embodiment, a method generally comprises receiving on a private network at a Network Address Translation (NAT) gateway, a Generic Routing Encapsulation (GRE) packet comprising a client address and a GRE node private Internet Protocol (IP) address, mapping the client address to the GRE node private IP address at the NAT gateway, storing the mapping at the NAT gateway, replacing the GRE node private IP address in the GRE packet with a public IP address of the NAT gateway, and transmitting the GRE packet from the NAT gateway on a public network. The mapping is used in forwarding packets received on the public network at the NAT gateway to a client on the private network.

In another embodiment, an apparatus generally comprises a first interface for communication with a private network and configured to receive a Generic Routing Encapsulation (GRE) packet comprising a client address and a GRE node private Internet Protocol (IP) address, a processor operable to map the client address to the GRE node private IP address, and replace the GRE node private IP address in the GRE packet with a public IP address of the apparatus, a second interface for communication with a public network and configured to transmit the packet on the public network, and memory for storing the mapping. The mapping is used in forwarding packets received on the public network to a client on the private network.

In yet another embodiment, logic is encoded on one or more non-transitory computer readable media for execution and when executed operable to process at a Network Address Translation (NAT) gateway, a Generic Routing Encapsulation (GRE) packet comprising a client address and an GRE node private Internet Protocol (IP) address, map the client address to the GRE node private IP address at the NAT gateway, store the mapping at the NAT gateway, replace the GRE node private IP address in the GRE packet with a public IP address of the NAT gateway, and transmit the GRE packet from the NAT gateway on a public network. The mapping is used in forwarding packets received on the public network at the NAT gateway to a client on the private network.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Network Address Translation (NAT) is used to map one IP (Internet Protocol) address space into another by modifying network address information in an IP packet header when packets pass through a network device (e.g., router, gateway). A NAT gateway may be used, for example, to transfer data between private and public networks. Almost all Internet traffic from client sites comprises TCP (Transmission Control Protocol) and UDP (User Datagram Protocol) packets. For these protocols, port numbers are used inside the protocol to uniquely identify a client session and avoid ambiguity in how to translate returned packets. When conventional IP network traffic traverses a NAT gateway, the network gateway may manipulate and record the source port and protocol information for the network session. When traffic returns to the NAT gateway, the gateway can look up the original source port address and source address information, and send the traffic back to the original device on its private IP address.

Ethernet over Generic Routing Encapsulation (EoGRE) cannot easily cross Network Address Translation (NAT) boundaries. EoGRE does not have ports that allow for creation of a record to bind traffic from the NAT gateway, to be mapped back to a private IP address when it returns to the NAT gateway. A single GRE device behind a NAT gateway may be able to use GRE pass-through to allow a single GRE tunnel to utilize network address translation, but the lack of protocol ports in GRE means that ports cannot be used for address overloading in which multiple clients share a single private IP address. This makes it very difficult to place multiple EoGRE nodes behind a NAT gateway. If multiple EoGRE nodes are needed, the same number of public IP addresses need to be used in conventional systems. The EoGRE nodes would then have to either directly use these public IP addresses or have their private IP addresses manually mapped to these private IP addresses. Manual mapping of private IP address to public IP address on the NAT gateway would require EoGRE nodes to be manually configured with a fixed IP address. This results in expensive custom manual configuration for deployment of EoGRE gateways at a customer site.

The embodiments described herein provide for use of multiple GRE nodes in communication with a NAT gateway. In one embodiment, packets on an EoGRE tunnel are inspected to identify a client address, which is mapped to the private IP address of a transmitting EoGRE node in a translation table at the NAT gateway. The translation table allows multiple EoGRE nodes to be supported behind the NAT gateway.

Referring now to the drawings, and first to FIG. 1, a network in which embodiments described herein may be implemented is shown. The embodiments operate in the context of a data communication network including multiple network devices. For simplification, only a small number of nodes are shown. The network may include any number of network devices in communication via any number of nodes (e.g., routers, switches, gateways, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). More specifically, the nodes may communicate over a GRE tunnel, as described below.

The network shown in the example of FIG. 1 includes an access point (AP) 10 in communication with a client 11 over a WLAN (Wireless Local Area Network) 13 and in communication with a Network Address Translation (NAT) gateway 12 over a private network 14. The NAT gateway 12 is also in communication with a Tunnel Termination Gateway (TTG) 16 over a public network 18. The access point 10 and TTG 16 operate as endpoints of a GRE tunnel (EoGRE tunnel 17).

The network may include any number or types of access points 10, which may communicate with any number of clients (client devices, mobile devices, stations). The client device 11 may be, for example, a personal computer, laptop, mobile device (e.g., phone, tablet, personal digital assistant), or any other wireless device. The client 11 may also comprise a network device in wired communication with the access point 10. The private network 14 may be in communication with any number of access points 10 over any number of tunnels 17. Each access point 10 may service any number of client devices 11, which may roam between the access points. The access point 10 may include a wired interface for communication with the private network 14 and a wireless interface (e.g., IEEE 802.11 WLAN interface) for communication with the client 11. The access point 10 may be configured, for example, for LWAPP (Lightweight Access Point Protocol). Mobile nodes 11 may access the Internet or other network over the access point 10. The AP 10 may be autonomous or connected to a wireless LAN (Local Area Network) controller.

As noted above, the access point 10 defines one end of the EoGRE tunnel 17 and may be referred to as an EoGRE node (or GRE node). The tunnel termination gateway 16 is located at the other end of the EoGRE tunnel and also operates as an EoGRE (or GRE) node. The EoGRE nodes 10, 16 are configured to encapsulate a payload packet (e.g., IP packet) in a GRE packet. The resulting packet can then be encapsulated in another protocol, such as Ethernet, and forwarded over the tunnel 17.

The TTG (Tunnel Termination Gateway) 16 may be any network device (e.g., router) operable to encapsulate and forward packets over the GRE tunnel 17, and decapsulate and forward packets received on the GRE tunnel. The TTG 16 may be in communication with the Internet or any other network or hosts. The client devices 11 communicate with the network or hosts via the TTG 16.

Clients 11 in communication with the EoGRE node 10 may be bridged via EoGRE to the NAT gateway 12. The NAT gateway 12 may comprise a router or any other network device configured to perform routing or forwarding functions. The NAT gateway 12 allows clients at a customer site to use private IP addresses, which can be reused at other customer sites because they are not routed on the public network 18. Multiple clients 11 may share one private IP address. When the client 11 is sending traffic to Internet hosts, the NAT gateway 12 substitutes its own public address for the private address of the GRE node 10, as described in detail below.

In certain embodiments, the NAT gateway 12 includes a GRE/NAT module 19 operable to map client addresses to private GRE node IP addresses and store these mappings. For example, the GRE/NAT module 19 may map a client source MAC (Media Access Control) address to the EoGRE node 10 IP address in a translation table as shown in the example of FIG. 2 and described below.

Figure 2:
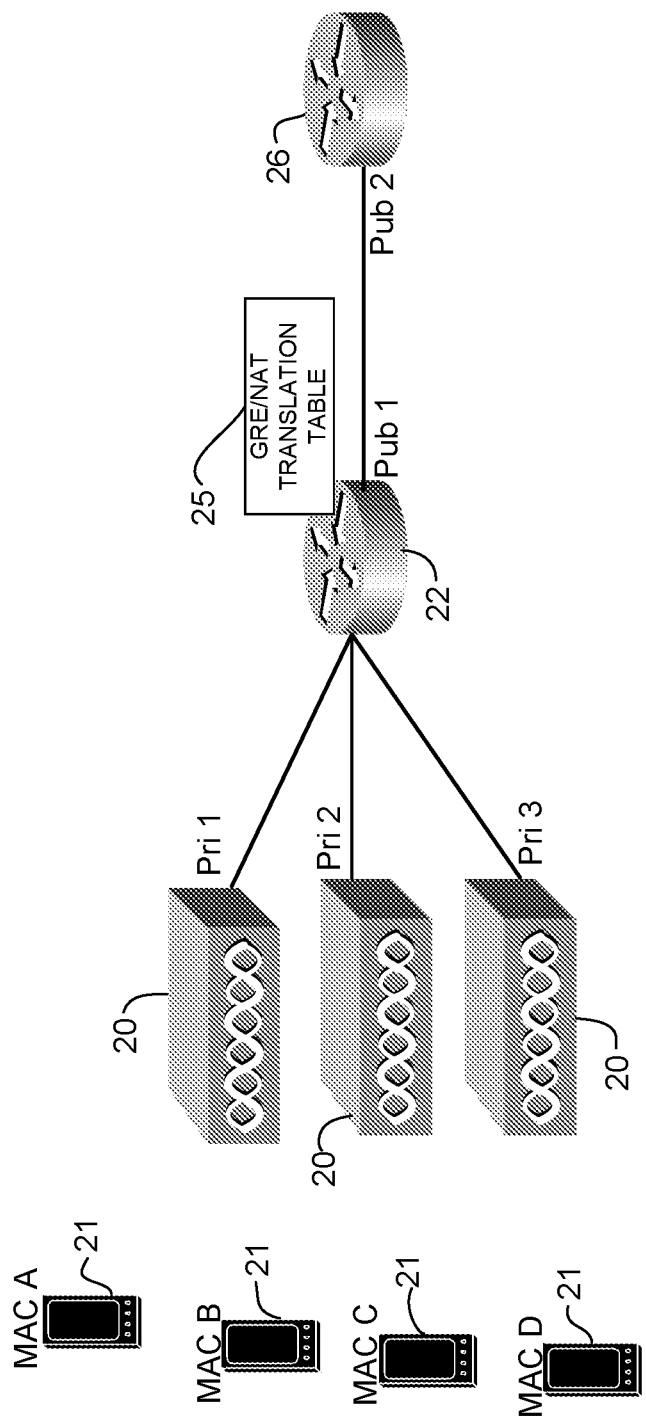
FIG. 2 illustrates an example of the network shown in FIG. 1.

FIG. 2 illustrates an example topology for components within the network shown in FIG. 1. In this example, the network includes a plurality of access points 20 in wireless communication with a plurality of client devices 21. Each of the client devices comprises a MAC address (MAC A, MAC B, MAC C, MAC D). Each EoGRE node 20 comprises a private IP address (Pri 1, Pri 2, Pri 3). Traffic received from the client device 21 is transmitted over the private network to NAT gateway 22, which comprises a public IP address (Pub 1). The NAT gateway 22 is in communication over a public network with TTG node 26 comprising a public IP address (Pub 2).

Figure 3:
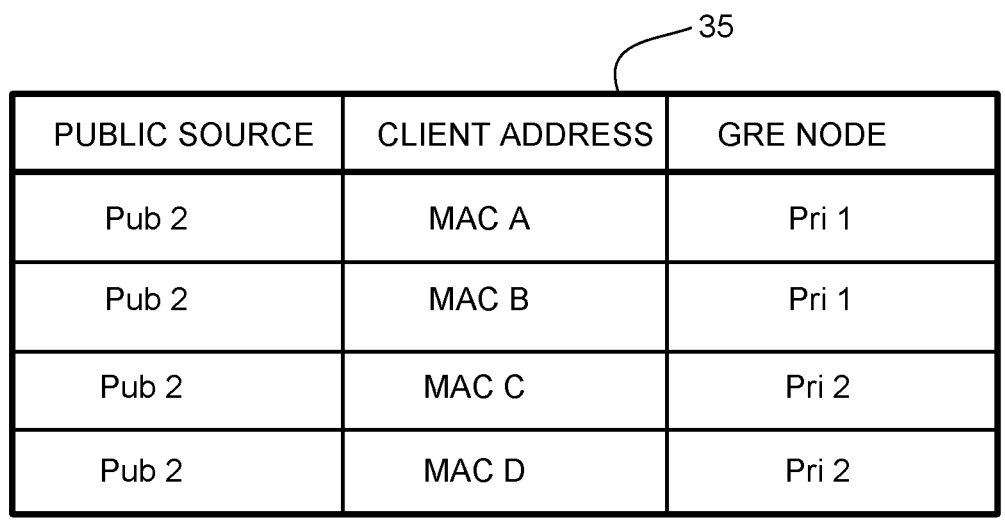
FIG. 3 depicts an example of a translation table for use in forwarding GRE (Generic Routing Encapsulation) packets at a NAT (Network Address Translation) gateway, in accordance with one embodiment.

In one embodiment, the NAT gateway 22 includes a GRE/NAT translation table 25 comprising mappings of client addresses (e.g., MAC address, IP address (for PMIPv6)) to private GRE node IP addresses. FIG. 3 illustrates an example of a translation table 35 for the NAT gateway 22 shown in FIG. 2. In this example, the table 35 is created for communication with the TTG node 26 (Pub 2) and includes an entry for each client device 21. As shown in FIG. 3, each client MAC address (MAC A, MAC B, MAC C, MAC D) is mapped to a corresponding GRE node IP address (Pri 1, Pri 2). In the example shown in FIGS. 2 and 3, clients A and B are mapped to the access point 20 with IP address corresponding to Pri 1, and clients C and D are mapped to the access point with IP address corresponding to Pri 2. As described in detail below, the NAT gateway 22 creates entries for the table 35 based on packets received from the clients 21 on the private network (over the EoGRE tunnel) (FIG. 2). If the client 21 roams to a different access point 20, the translation table 25 at the NAT gateway 22 will be updated upon receiving a packet identifying the new private source IP address of the new access point.

The translation table allows GRE nodes to be placed behind the NAT gateway, with dynamically assigned private IP addresses sharing one public IP address. The network may include any number of clients and any number or type of GRE nodes (e.g., EoGRE node) in communication with the NAT gateway. For example, a NAT gateway may store the following mappings:

Client MAC A=EoGRE-Node 1
Client MAC B=EoGRE-Node 1
Client MAC C=EoGRE-Node 1
Client MAC X=EoGRE-Node 2
Client MAC Y=EoGRE-Node 2
Client MAC Z=EoGRE-Node 2
Client MAC L=EoGRE-Node 3
Client MAC M=EoGRE-Node 3
Client MAC N=EoGRE-Node 3

The embodiments described herein may also be implemented when using PMIPv6 (Proxy Mobile IPv6) behind a NAT gateway, as the client data is also carried in GRE. In this case, the protocol field identifies the traffic as IPv4 in GRE, and the translation table is built with client IP addresses rather than MAC addresses.

It is to be understood that the networks shown in FIGS. 1 and 2 and described above are only examples and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network. Nodes may be coupled to other nodes through one or more interfaces employing any suitable wired or wireless connection, which provides a viable pathway for electronic communications.

Figure 4:
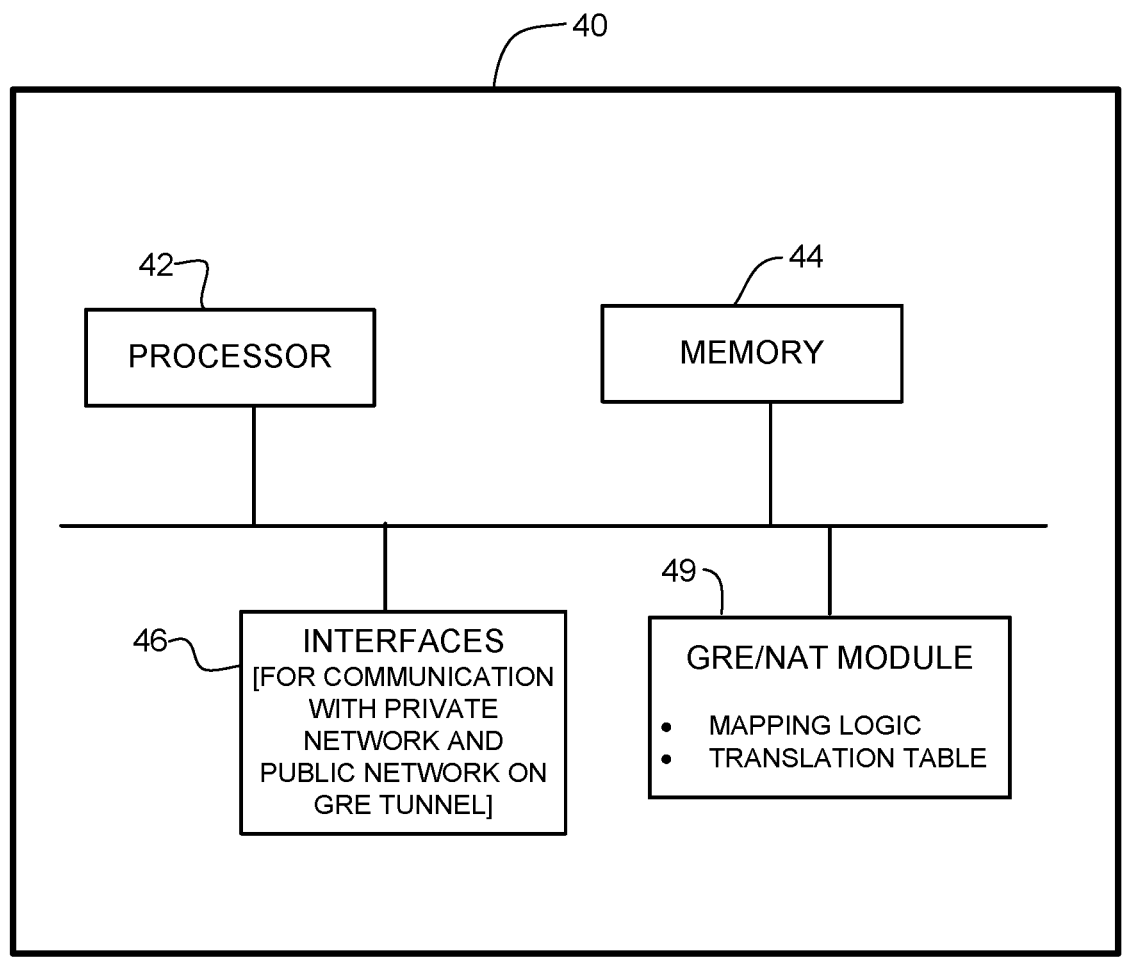
FIG. 4 depicts an example of a network device useful in implementing embodiments described herein.

FIG. 4 illustrates an example of a network device 40 (e.g., NAT gateway 12 in FIG. 1, NAT gateway 22 in FIG. 2) that may be used to implement the embodiments described herein. In one embodiment, the network device 40 is a programmable machine that may be implemented in hardware, software, or any combination thereof. The network device 40 includes one or more processor 42, memory 44, network interface 46, and GRE/NAT module 49.

Memory 44 may be a volatile memory or non-volatile storage, which stores various applications, operating systems, modules, and data for execution and use by the processor 42. For example, components of GRE/NAT module 49 (e.g., code, logic, software, firmware, etc.) may be stored in memory 44. Memory 44 may also store the translation table 25, 35 or any other data structure for storing client address to GRE node address mappings.

Logic may be encoded in one or more tangible media for execution by the processor 42. For example, the processor 42 may execute codes stored in a computer-readable medium such as memory 44. The processor 42 may be configured to implement one or more of the functions described herein. For example, the processor 42 may execute codes stored in a computer-readable medium such as memory 44 to perform processes described below with respect to FIG. 5. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 46 may comprise any number of interfaces (linecards, ports) for receiving data or transmitting data to other devices. As shown in FIG. 2, the NAT gateway may comprise interfaces for receiving and transmitting GRE packets on the private network and the public network. The network interface 46 may include, for example, an Ethernet interface for connection to a computer or network. The network interfaces 46 may be configured to transmit or receive data using a variety of different communication protocols (e.g., GRE, EoGRE). The interfaces 46 may include mechanical, electrical, and signaling circuitry for communicating data over physical links coupled to the network.

It is to be understood that the network device 40 shown in FIG. 4 and described above is only an example and that different configurations of network devices may be used. The network device 40 may further include any suitable combination of hardware, software, algorithms, processors, devices, components, or elements operable to facilitate the capabilities described herein.

Figure 5:
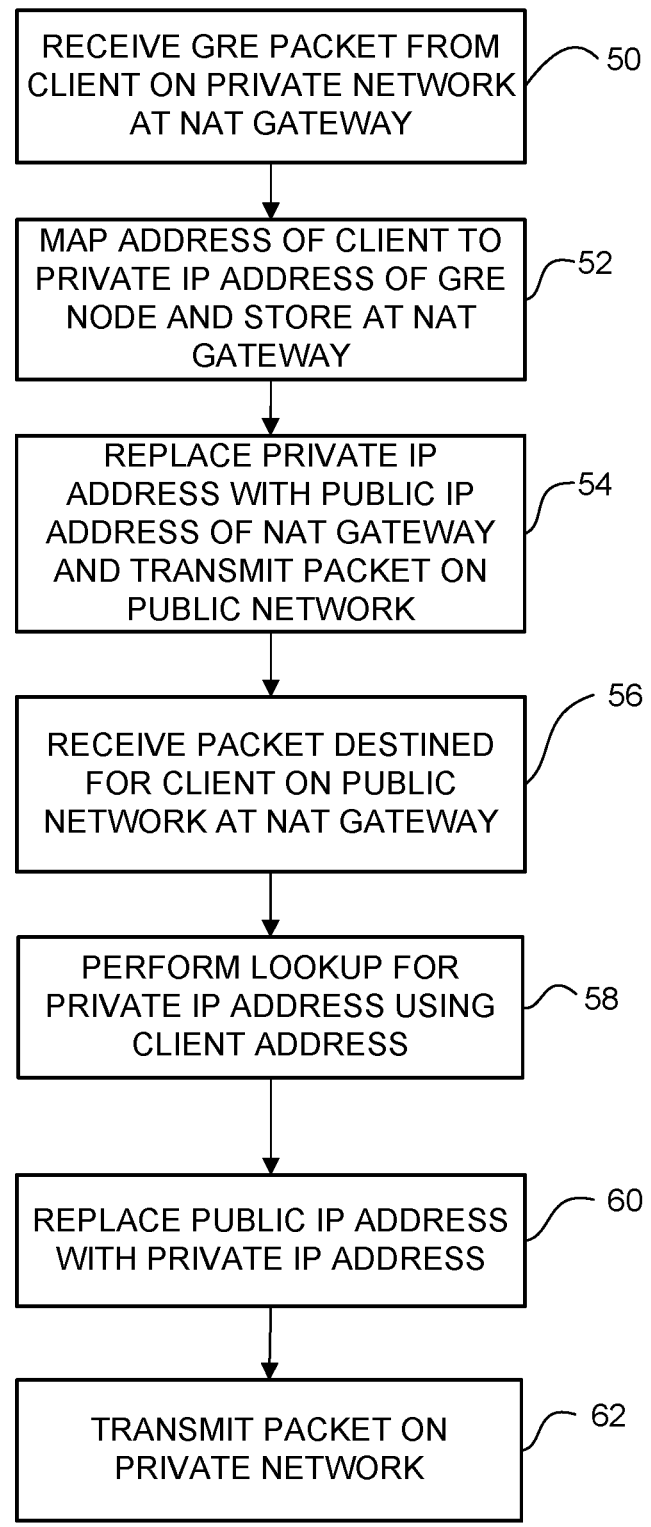
FIG. 5 is a flowchart illustrating an overview of a process for forwarding GRE packets at the NAT gateway, in accordance with one embodiment.

FIG. 5 is a flowchart illustrating an example of a process for forwarding GRE packets at a NAT gateway, in accordance with one embodiment. At step 50, the NAT gateway receives a GRE packet (e.g., EoGRE packet) from client 11 via the access point 10 in communication with the NAT gateway 12 via private network 14 (FIGS. 1 and 5). The GRE connection is initiated from the client side and a translation table mapping private GRE addresses to source MAC addresses is created. The NAT gateway 12 maps an address of the client (e.g., MAC source address) to a private IP address of the GRE node (access point 10) and stores the mapping in the translation table at the NAT gateway (step 52). The NAT gateway 12 replaces the private source IP address in the packet with a public IP address of the NAT gateway (step 54).

Upon receiving at the NAT gateway 12, a return packet on the public network 18 destined for the client 11 (step 56), the NAT gateway uses the destination address of the client (e.g., MAC address) in the packet to lookup the private IP address of the corresponding GRE node (step 58). The NAT gateway 12 replaces the public IP address in the packet with the private IP address found in the lookup (step 60) and transmits the packet to the GRE node 10 on the private network (step 62).

It is to be understood that the process shown in FIG. 5 and described above is only an example and steps may be added, modified, reordered, or combined, without departing from the scope of the embodiments. Also, it may be noted that the processor 42 or the GRE/NAT module 49 shown in FIG. 4 (or a combination thereof) may implement one or more of the steps shown in FIG. 5 and described herein. For example, logic encoded on a computer readable media and executed by the processor 42 may be operable to perform one or more steps shown in FIG. 5.

Figure 6:
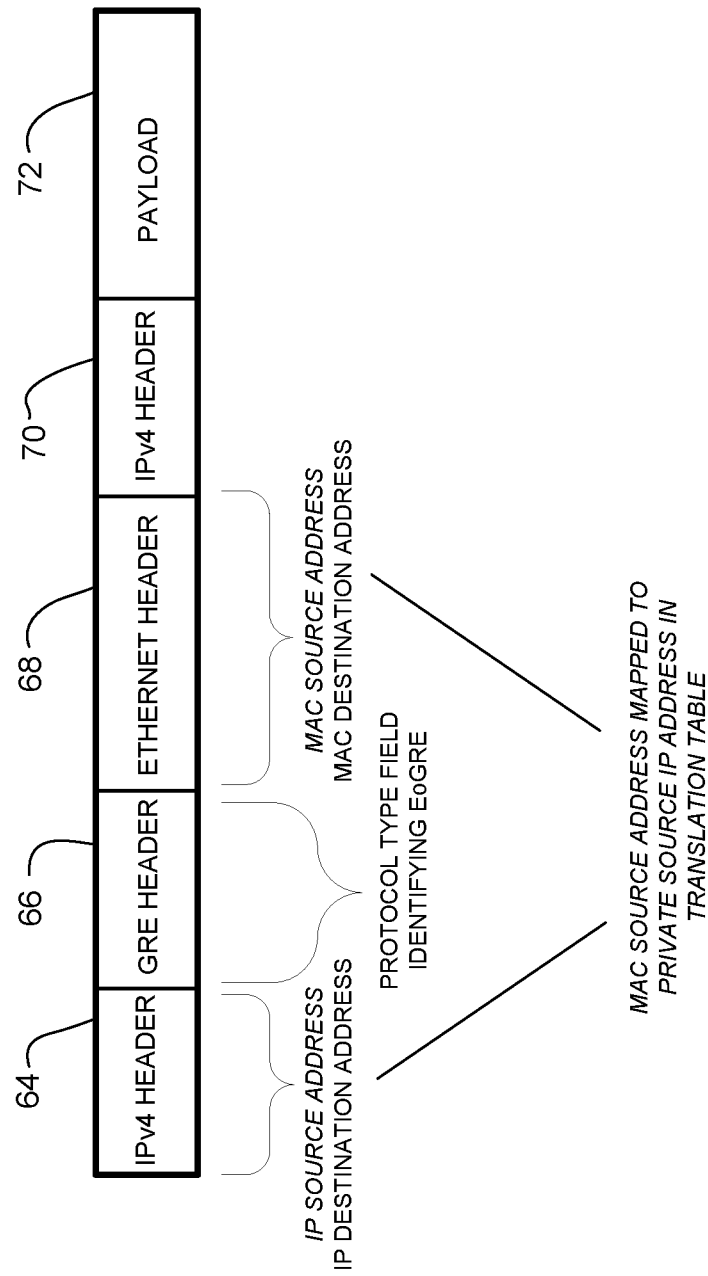
FIG. 6 illustrates a packet format and addresses used in the translation table of FIG. 3, in accordance with one embodiment.

FIG. 6 illustrates an example of a packet format for the EoGRE packet, in accordance with one embodiment. The packet includes an outer IPv4 header 64, GRE header 66, Ethernet header 68, inner IPv4 header 70, and payload 72. The outer IPv4 header 64 is for use between the two EoGRE endpoints (nodes 10, 16 in FIG. 1). The inner IPv4 header 70 is for use between the client device and Internet nodes. In one example, the GRE header 66 has a format as described in IETF RFC 2784, "Generic Routing Encapsulation (GRE)", D. Farinacci et al., March 2000. The GRE header 66 may include, for example, a protocol type field that identifies the packet as a GRE (or EoGRE) packet. The Ethernet header 68 may be referred to as a delivery header and includes a MAC source address and MAC destination address. In this example, the payload includes an IPv4 packet, which includes an IPv4 header comprising an IP source address and IP destination address.

As previously described, the MAC source address from the Ethernet header 64 is mapped to the private IP address of the GRE node in the IP header 68 and stored in the translation table at the NAT gateway 12. The translation table is used to identify the private IP source address when a packet is received from the public network 18 at the NAT gateway 12 based on the MAC destination address in the received packet.

It is to be understood that the packet format shown in FIG. 6 and described above is only an example and that different headers, formats, or fields, may be used without departing from the scope of the embodiments. For example, as noted above, PMIPv6 may also be used.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving from a client on a private network at a Network Address Translation (NAT) gateway, an Ethernet over Generic Routing Encapsulation (EoGRE) packet comprising a client source Media Access Control (MAC) address and an EoGRE node private Internet Protocol (IP) address, the EoGRE packet received from an EoGRE node comprising an access point in communication with a plurality of client devices and configured for LWAPP (Lightweight Access Point Protocol);
identifying said client source MAC address in the EoGRE packet;
mapping said client source MAC address to said EoGRE node private IP address at the NAT gateway, wherein said EoGRE node private IP address is dynamically assigned and multiple of said EoGRE node private IP addresses share a public IP address;
storing said mapping at the NAT gateway in a table comprising entries for said plurality of client devices, said entries mapping client addresses comprising PMIPv6 (Proxy Mobile IPv6) addresses to EoGRE node IP addresses, wherein said mapping is used in forwarding packets received on a public network at the NAT gateway to the client on the private network;
replacing said EoGRE node private IP address in the EoGRE packet with said public IP address of the NAT gateway; and
transmitting the EoGRE packet from the NAT gateway on the public network over an EoGRE tunnel comprising a tunnel termination gateway at an endpoint of the tunnel in communication with a destination of the EoGRE packet; and
receiving another packet from the client after the client has roamed to a new access point and updating the table with a new EoGRE node private IP address;
wherein the access point is in communication with the client over a WLAN (Wireless Local Area Network) and in communication with the NAT gateway over the private network and the EoGRE node private IP address is not routed on the public network and may be reused at other customer sites.

2. The method of claim 1 wherein the NAT gateway is located in the EoGRE tunnel and wherein one endpoint of the tunnel comprises the access point.

3. The method of claim 1 wherein said GRE node private IP address comprises an IPv4 address.

4. An apparatus comprising:
a first interface for communication with a private network and configured to receive from a client, an Ethernet over Generic Routing Encapsulation (EoGRE) packet comprising a client source Media Access Control (MAC) address and an EoGRE node private Internet Protocol (IP) address, the EoGRE packet received from an EoGRE node comprising an access point in communication with a plurality of client devices and configured for LWAPP (Lightweight Access Point Protocol);
a processor operable to identify said client source MAC address in the EoGRE packet, map said client address to said EoGRE node private IP address, replace said EoGRE node private IP address in the GRE packet with a public IP address of the apparatus, and process another packet from the client after the client has roamed to a new access point and update the table with a new EoGRE node private IP address;
a second interface for communication with a public network and configured to transmit the EoGRE packet on a public network; and
memory for storing said mapping in a table comprising entries for a plurality of client devices, said entries mapping client addresses comprising PMIPv6 (Proxy Mobile IPv6) addresses to EoGRE node IP addresses;
wherein said mapping is used in forwarding packets received on the public network to a client on the private network, said GRE node private IP address is dynamically assigned, multiple of said GRE node private IP addresses share the public IP address, the access point is in communication with the client over a WLAN (Wireless Local Area Network) and in communication with the NAT gateway over the private network, and the EoGRE node private IP address is not routed on the public network and may be reused at other customer sites.

5. The apparatus of claim 4 wherein the NAT gateway is located in the EoGRE tunnel and wherein one endpoint of the tunnel comprises the access point.

6. The apparatus of claim 4 wherein said GRE node private IP address comprises an IPv4 address.

7. One or more non-transitory computer readable media encoding logic for execution by a processor and when executed operable to:
process at a Network Address Translation (NAT) gateway, an Ethernet over Generic Routing Encapsulation (EoGRE) packet comprising a client source Media Access Control (MAC) address and-a an EoGRE node private Internet Protocol (IP) address, the EoGRE packet received from-a an EoGRE node in communication with a plurality of client devices, and configured for LWAPP (Lightweight Access Point Protocol);

identify said client source MAC address in the EoGRE packet:

map said client source MAC address to said EoGRE node private IP address at the NAT gateway;

store said mapping at the NAT gateway in a table comprising entries for a plurality of client devices, said entries mapping client addresses comprising PMIPv6 (Proxy Mobile IPv6) addresses to EoGRE node IP addresses, wherein said mapping is used in forwarding packets received on a public network at the NAT gateway to the client on the private network;

replace said EoGRE node private IP address in the EoGRE packet with a public IP address of the NAT gateway; and transmit the EoGRE packet from the NAT gateway on a public network over an EoGRE tunnel comprising a tunnel termination gateway at an endpoint of the tunnel in communication with a destination of the EoGRE packet; and receive another packet from one of said plurality of client devices after the client has roamed to a new access point and update the table with a new EoGRE node private IP address;

wherein said EoGRE node private IP address is dynamically assigned, multiple of said EoGRE node private IP addresses share the public IP address, the access point is in communication with the client over a WLAN (Wireless Local Area Network) and in communication with the NAT gateway over the private network, and the EoGRE node private IP address is not routed on the public network and may be reused at other customer cites.

8. The method of claim 1 wherein the table is created for communication with the tunnel termination gateway and comprises an entry for each of said plurality of client devices.

9. The method of claim 1 further comprising creating said entries in the table upon receiving packets from said plurality of clients on the private network and over the EoGRE tunnel.

10. The method of claim 1 further comprising encapsulating a payload packet in a GRE packet and encapsulating the GRE packet in Ethernet before transmitting the EoGRE packet from the NAT gateway on the public network.

11. The apparatus of claim 4 wherein the table is created for communication with the tunnel termination gateway and comprises an entry for each of said plurality of client devices.

12. The apparatus of claim 4 wherein the processor is further operable to create said entries in the table upon receiving packets from said plurality of clients on the private network and over the EoGRE tunnel.

13. The apparatus of claim 4 wherein the processor is further operable to encapsulate a payload packet in a GRE packet and encapsulate the GRE packet in Ethernet before transmitting the EoGRE packet from the NAT gateway on the public network.

14. The one or more non-transitory computer readable media of claim 7 wherein the table is created for communication with the tunnel termination gateway and comprises an entry for each of said plurality of client devices.

15. The one or more non-transitory computer readable media of claim 7 further operable to create said entries in the table upon receiving packets from said plurality of clients on the private network and over the EoGRE tunnel.

16. The one or more non-transitory computer readable media of claim 7 further operable to encapsulate a payload packet in a GRE packet and encapsulate the GRE packet in Ethernet before transmitting the EoGRE packet from the NAT gateway on the public network.

* * * * *